US007458144B2

(12) United States Patent
Barina et al.

(10) Patent No.: US 7,458,144 B2
(45) Date of Patent: Dec. 2, 2008

(54) REMOTE CONNECTOR SYSTEM

(75) Inventors: Richard M. Barina, Sebring, FL (US); Norman Bruce Desrosiers, Oxford, NC (US); Dean Frederick Herring, Youngsville, NC (US); Paul Andrew Wormsbecher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 11/312,093

(22) Filed: Dec. 20, 2005

(65) Prior Publication Data

US 2007/0141902 A1 Jun. 21, 2007

(51) Int. Cl.
*B23P 19/00* (2006.01)

(52) U.S. Cl. .......................... 29/794; 29/426.5; 29/758; 29/876; 439/352

(58) Field of Classification Search .................. 29/857, 29/861, 876, 758, 761, 762, 764, 426.1, 426.5; 439/352–358, 483, 567
See application file for complete search history.

(56) References Cited

U.S. PATENT DOCUMENTS

| | | | | |
|---|---|---|---|---|
| 3,559,267 | A | 2/1971 | Castellani | |
| 3,953,098 | A * | 4/1976 | Avery et al. | 439/258 |
| 4,083,101 | A | 4/1978 | Coller | |
| 4,604,796 | A | 8/1986 | Tsipenyuk et al. | |
| 4,858,309 | A | 8/1989 | Korsunsky et al. | |
| 4,866,838 | A * | 9/1989 | Porter | 29/758 |
| 5,046,237 | A | 9/1991 | Conforti et al. | |
| 6,158,111 | A | 12/2000 | Doye et al. | |
| 6,179,642 | B1 * | 1/2001 | Hwang | 439/358 |
| 6,202,295 | B1 | 3/2001 | Easter et al. | |
| 6,249,960 | B1 | 6/2001 | Faesel | |
| 6,394,842 | B1 * | 5/2002 | Sakurai et al. | 439/352 |
| 2004/0194304 | A1 | 10/2004 | Armstrong et al. | |

FOREIGN PATENT DOCUMENTS

| | | |
|---|---|---|
| CN | 2562421 Y | 7/2003 |

* cited by examiner

*Primary Examiner*—Donghai D. Nguyen
(74) *Attorney, Agent, or Firm*—Cynthia S. Byrd; Schubert Osterrieder & Nickelson PLLC

(57) ABSTRACT

An apparatus for inserting and/or removing a connector with a remote connector agent are disclosed. Embodiments may include a remote connector agent apparatus having a main body forming a connector cavity and one or more insertion snap pushers each having a lower surface. The insertion snap pushers may move outward during insertion of a connector into the connector cavity and move inward after insertion of the connector so that the snap pusher lower surfaces rest on a lip of the connector after insertion. Embodiments may also include a retraction holder ledge to support the lip of the inserted connector during retraction and a connector snap release actuator to pivot a snap of the inserted connector in response to a pulling force on the remote connector agent. The insertion snap pushers and the retraction holder ledge may have a float distance between them larger than the lip height.

3 Claims, 8 Drawing Sheets

REMOTE CONNECTOR SYSTEM

FIELD OF INVENTION

The present invention generally relates to the field of tools for inserting or removing connectors from a board such as a printed circuit board. More particularly, the present invention relates to a system, method, and apparatus for inserting and/or removing a connector with a remote connector agent.

BACKGROUND

As computer technology continues to advance, computers are required to perform increasingly complex tasks. With the increasing complexity of tasks, the circuitry found in computers has also become more complex. Computer designers and manufacturers also desire to provide these complex functions with a minimum amount of space to satisfy consumers and to reduce costs, resulting in increasingly high-density circuitry for computers. The high density of circuitry has resulted in both smaller components (e.g., headers and connectors) as well as components that are harder for users to reach.

High-density circuitry results in difficulties both at installation or construction as well as later with repair or replacement of parts. This problem often manifests with expansion headers of boards in a computer. Boards, such as printed circuit boards (PCBs), allow for expansion of a computer system by connecting components of a computer system to board headers. Connectors that fit into board headers are well known in the art. These connectors typically have a plurality of electrical pins that insert into the header and a plurality of wires that connect to a component. To release the connector, a user may simply pull on the connector until its electrical pins retract from the header. In a densely packed computer, however, it may be difficult for a user to reach the connector in order to pull it out, resulting in user frustration.

This problem is exacerbated when the connector is latched to the header instead of simply inserted. Connectors are often latched to headers when it is desired that the connector does not come loose from the header, such as when a connector is used for a power supply or other important components. To latch to a header, connectors typically have a snap which, when the connector is inserted into a header, attaches the connector to the header via a header latch point on the header. Once the connector snap is in place, the connector is securely attached to the header. To remove the connector, a user must press a finger release touch point on the snap that releases the snap so that the connector may then be extracted. Because of the high density of circuit boards, however, a user may have difficulty in reaching the snap and thus cannot press the finger release touch point to release the connector. Similarly, users may have problems inserting the connector in the first place in situations where the header is difficult to get to for a user's hands. These problems can be worsened when a more robust latch is used, such as may be used for more crucial connections like those for power supplies. Even when users can reach the connector with their fingers, it may be ergonomically undesirable for them to have to press a small button in a possibly hard-to-reach location.

As the density of computer components continues to increase, users are likely to become increasingly frustrated with difficulties in inserting, latching, and removing connectors from board headers. There is, therefore, a need for an effective system to insert and remove connectors from boards.

SUMMARY OF THE INVENTION

The problems identified above are in large part addressed by a system, method, and apparatus for inserting and/or removing a connector with a remote connector agent. Embodiments may include a remote connector agent apparatus having a main body forming a connector cavity and one or more insertion snap pushers each having a snap pusher lower surface. The insertion snap pushers may move outward during insertion of a connector into the connector cavity and move inward after insertion of the connector so that the snap pusher lower surfaces rest on a lip of the connector after insertion of the connector. Embodiments may also include a retraction holder ledge to support the lip of the inserted connector during retraction and a connector snap release actuator to pivot a snap of the inserted connector in response to a pulling force on the remote connector agent. In a further embodiment, the insertion snap pushers and the retraction holder ledge have a float distance between them that is larger than the height of the connector lip.

Embodiments may include a remote connector system having a connector and a remote connector agent. Embodiments of the connector may include a body having a lip, a plurality of wires, and a plurality of electrical pins, where the lip has a lip height. The connector may also include a pivotable snap attached to the body and having a finger release touch point to attach the connector to a header. Embodiments of the remote connector agent may include a main body forming a connector cavity and one or more insertion snap pushers each having a snap pusher lower surface. The insertion snap pushers may move outward during insertion of a connector into the connector cavity and move inward after insertion of the connector so that the snap pusher lower surfaces rest on a lip of the connector after insertion of the connector. Embodiments may also include a retraction holder ledge to support the lip of the inserted connector during retraction and a connector snap release actuator to pivot a snap of the inserted connector in response to a pulling force on the remote connector agent. In a further embodiment, the insertion snap pushers and the retraction holder ledge have a float distance between them that is larger than the height of the connector lip.

Another embodiment provides a method of inserting and removing a connector. Embodiments of the method may include inserting a connector into a remote connector agent to form a remote connector system and pushing the remote connector into a header of a board to insert the connector into the header. Embodiments may also include pulling the remote connector system to retract the remote connector from the header. In some embodiments, inserting the connector into the remote connector agent further comprises pushing back one or more insertion snap pushers to allow insertion of the connector. In some embodiments, pulling the remote connector system further comprises releasing a snap of the connector with a snap release actuator before retracting the remote connector system from the header.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods, and media for inserting and/or removing a connector with a remote connector agent are disclosed. Embodiments may include a remote connector agent apparatus having a main body forming a connector cavity and one or more insertion snap pushers each having a snap pusher lower surface. The insertion snap pushers may move outward during insertion of a connector into the connector cavity and move inward after insertion of the connector so that the snap pusher lower surfaces rest on a lip of the connector after insertion of the connector. Embodiments may also include a retraction holder ledge to support the lip of the inserted connector during retraction and a connector snap release actuator to pivot a snap of the inserted connector in response to a pulling force on the remote connector agent. In a further embodiment, the insertion snap pushers and the retraction holder ledge have a float distance between them that is larger than the height of the connector lip.

The disclosed system may provide for an effective mechanism for inserting a connector into a circuit board and removing the connector from the board. Using the disclosed remote connector agent, a user may insert a connector into the header after placing the connector within the remote connector agent. During insertion, the remote connector agent advantageously allows the snap of the connector to attach to the header without interference. When the user wishes to remove the connector from the header, they may pull upon the remote control agent to accomplish this task. The remote control agent remotely pivots the snap to release the connector from the header and, after release of the latch, allows the user to pull out the connector from the header. A user of the disclosed remote control agent may thus efficiently and effectively remotely attach and remove a connector from a header, including latching and unlatching the connector. Using the remote control agent may be particularly useful when a header is in a location that is hard to reach, simplifying the user's task of attaching and removing the connector. Even where a connector is not difficult to reach, the disclosed system may provide an ergonomic advantage over previous systems as pushing and pulling the remote connector agent may be better ergonomically than having to push a small snap for some users.

Figure 1:
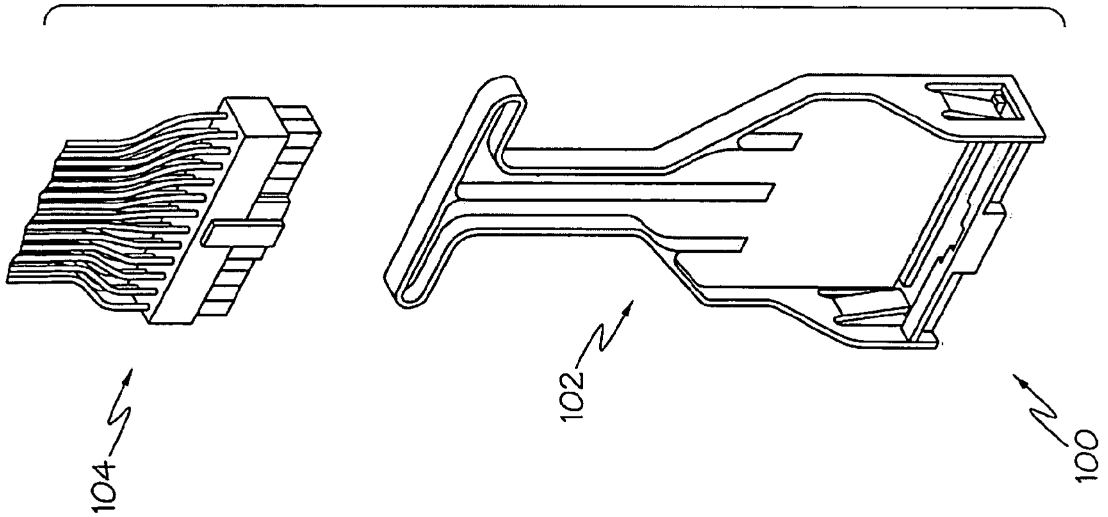
FIG. 1 depicts a front, top, and right side perspective view of a remote connector system with a connector and remote connector agent according to one embodiment.

Turning now to the drawings, FIG. 1 depicts a front, top, and right side perspective view of a remote connector system with a connector and remote connector agent according to one embodiment. In the depicted embodiment, the remote connector system 100 includes a connector 104 and a remote connector agent 102 that is adapted to allow insertion of the connector 104. Once the connector 104 is inserted, a user may insert the connector 104 into a board header (not shown) by pushing down on the remote connector agent 102 towards the header. Boards, such as printed circuit boards (PCBs), allow for expansion by connecting components of a computer system to board headers. Components may connect to the board header via a connector 104. Connectors typically have a plurality of electrical pins that insert into the header and a plurality of wires that connect to the component.

The remote connector agent 102 may have a body forming a connector cavity that may hold the connector 104. The remote control agent 102 may optionally also have a handle to facilitate pushing and pulling of the remote control agent 102 by a user. The remote control agent 102 may be constructed of any type of material, including metals such as die-cast aluminum, plastics, ceramics, or other materials. In some embodiments, a non-conductive material such as plastic or ceramic may be used to minimize the chance of an electrical short in the event that the board is not properly protected.

As will be described in more detail subsequently, the remote connector agent 102 may advantageously not interfere with the normal operation of the connector 104 during insertion of the connector 104 into a header. Normal operation of a connector 104 (as described in more detail in relation to FIG. 2) during insertion involves a snap of the connector 104 attaching to a protuberance of the header so that the connector 104 is securely attached to the header. While embodiments of the invention are described herein as utilizing a connector 104 with a snap that attaches to a header, one of ordinary skill in the art will recognize that the disclosed remote connector agent 102 may also be used with connectors 104 that do not attach to headers or for inserting connectors 104 into headers that do not provide latching capability.

The remote connector agent 102 may also advantageously facilitate removal of a latched connector 104 from a header. Without the disclosed remote connector agent 102, a user must release the connector 104 from the header by pushing down on the snap so that the snap rotates, or pivots, and releases the connector from the header. The user must then manually pull the connector 104 out of the header. This task may be difficult for users as the header and snap may be located within densely-packed circuitry, making it challenging for the user to get their finger on the snap. A connector 104 installed using the remote connector agent 102 may remotely release the snap when a user pulls up on the remote connector agent 102, as will be described in more detail subsequently. The handle of the remote connector agent 102 may be significantly easier for a user to reach in many computer configurations, facilitating removal of the connector 104.

The remote connector agent 102 may be sized appropriately for the connectors 104 for which it is intended. The size and shape of a connector 104 may vary depending on manufacturer, intended use, the number of wires, the number of pins, or other factors. Connectors 104 generally fall into families of connectors with the same number of pins and an industry-standard size, though variations do occur. In some embodiments, a remote connector agent 102 may be sized for a connector 104 family of substantially similar size so that it may be utilized with any connectors 104 in that family. The remote connector agent 102 may also be shaped and sized appropriate for the form factor of the family of connectors 104 in these embodiments. The remote connector agent 102 may be sold as part of a package with a connector 104 or it may be sold separately. Connectors 104 may be provided by manufacturers such as Foxconn® Electronics Inc. (a subsidiary of Hon Hai Precision Industry Co., Ltd of Taiwan) or Molex® Inc. of Lisle, Ill.

Figure 2:
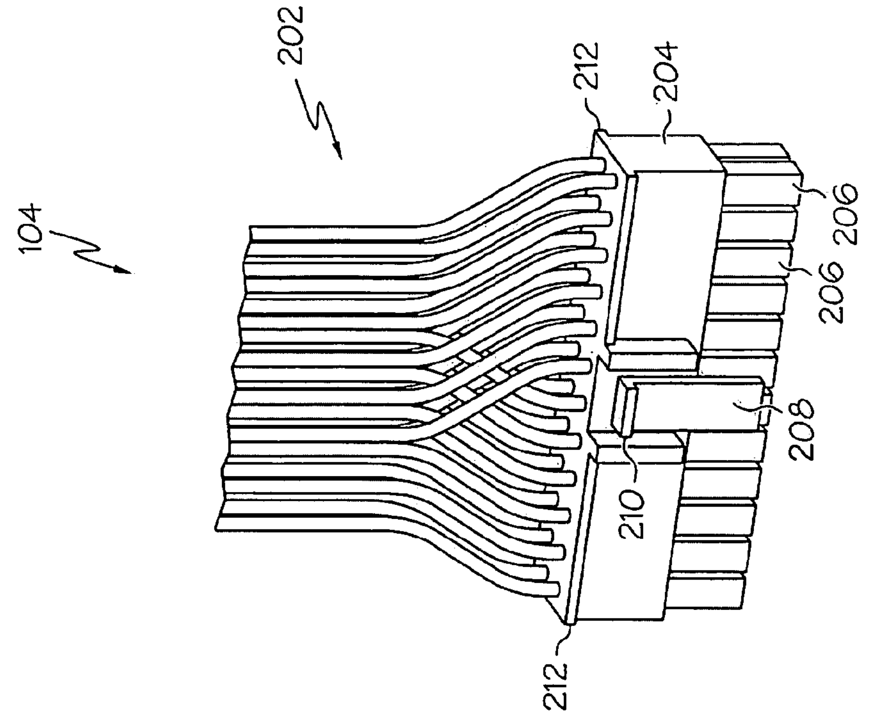
FIG. 2 depicts a front, top, and right side perspective view of a connector suitable for insertion into a remote connector agent according to one embodiment.

FIG. 2 depicts a front, top, and right side perspective view of a connector 104 suitable for insertion into a remote connector agent 102 according to one embodiment. In the depicted embodiment, connector 104 includes a plurality of wires 202 attached to a body 204. The wires 202 may connect to a component of a computer system in some embodiments. Attached to the body may be a plurality of electrical pins 206. The electrical pins 206 are the part of the connector 104 that are at least partially inserted into a header. Each electrical pin 206 may form an electrical connection with the header and one of the wires 202, providing the connection between the computer housing the board and the component. The body 204 may also have a lip 212 where the wires 202 enter the body.

Body 204 of the connector 104 may also have a snap 208 for latching to a board header. When the connector 104 is inserted, the snap 208 may rotate or pivot outward over a header latch point (a protuberance from the header) and 'snap' down over the header latch point when the connector 104 is fully inserted. To release the latch, a finger release touch point 210 of the snap 208 must be pushed down to pivot the snap 208 away from the header latch point. A sufficient force applied to the finger release touch point 210 releases the snap 208, allowing the connector 104 to be withdrawn from the header. As will be described in more detail subsequently, the connector snap release actuator of the remote control agent 102 may actuate (by applying a sufficient force) the finger release touch point 210 of a standard connector 104 to unlatch the connector 104 from the header.

Figure 3:
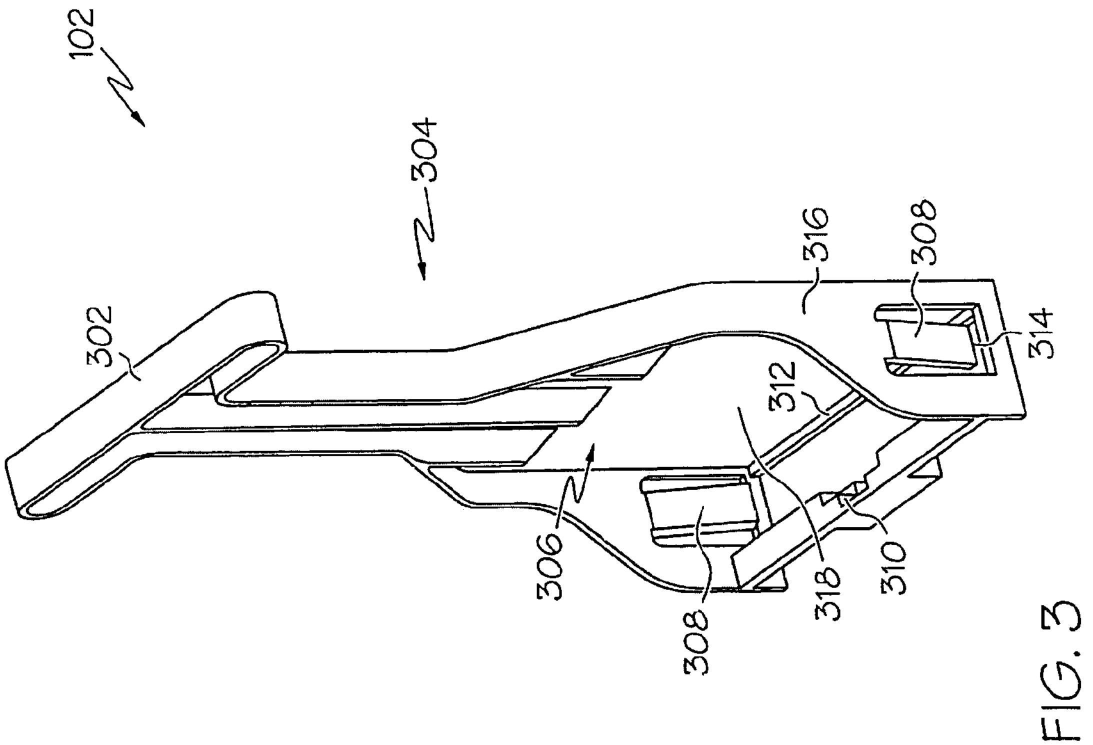
FIG. 3 depicts a front, top, and right side perspective view of the remote connector agent of FIG. 1 according to one embodiment.

FIG. 3 depicts a front, top, and right side perspective view of the remote connector agent 102 of FIG. 1 according to one embodiment. The depicted remote connector agent 102 includes a main body 304 forming a connector cavity 306. The main body 304 may include sidewalls 316 along with a back wall 318 to help from the connector cavity 306. The connector cavity 306 may be sized to accommodate a particular type or size of connector 104 in some embodiments. A handle 302 may also be attached to the main body 304 to facilitate pushing and pulling of the remote connector agent 102 by a user. For example, a user may push down on a flat upper surface of the handle 302 and pull up on a grip or other shape of the handle 302 that allows a pulling motion. A handle 302 is not required but may be beneficial to improve the ergonomics of the remote connector agent 102.

The remote connector agent 102 may also include one or more insertion snap pushers 308, which may be located in the main body sidewalls 316 in some embodiments. The insertion snap pushers 308 may be flexible and at least partially within the connector cavity 306 so as to be pushed outward during insertion of a connector 104. Once the connector 104 is fully inserted, the insertion snap pushers 304 may move inward so that they rest on top of the lip 212 of the connector 104. Each insertion snap pusher 308 may have a snap pusher lower surface 314 that may be in contact with the top surface of the lip 212. The snap pusher lower surface 314 may help retain the connector 104 in the remote connector agent 102 by preventing upward movement of the connector 104 when the remote connector agent 102 is being pushed downward.

The remote connector agent 102 may have a retraction holder ledge 312 around all or part of the bottom of the connector cavity 306. An installed connector 104 may be positioned so that is lip 212 is in contact with the retraction holder ledge 312 at some times. The retraction holder ledge 312 accordingly may provide a lower limit on the movement of an installed connector 104. When the remote connector agent 102 is being pulled upwards to extract the connector 104 from a header, the lip 212 may press against the retraction holder ledge 312, resulting in the upwards force necessary to extract the connector 104.

The remote connector agent 102 may also include a connector snap release actuator 310. The connector snap release actuator 310 may release the snap 208 of a connector 104 before the connector 104 is pulled upwards by the retraction holder ledge 312, allowing unrestrained movement of the connector 104 after release. The initial upward motion of an extracting remote connector agent 102 may cause the connector snap release actuator 310 to impart a force to the finger release touch point 210 of the snap 208, unlatching the connector 104. The lip 212 of a connector 204 may advantageously 'float' between the snap pusher lower surface 314 and the retraction holder edge 312 in some embodiments. In these embodiments, the distance between the snap pusher lower surface 314 and the retraction holder edge 312 may be larger than the height, or thickness, of the lip 212. As will be described in more detail in relation to FIG. 5, the float, or gap, between these two surfaces facilitates unlatching of the snap 208 during retraction of the connector 104.

Figure 4:
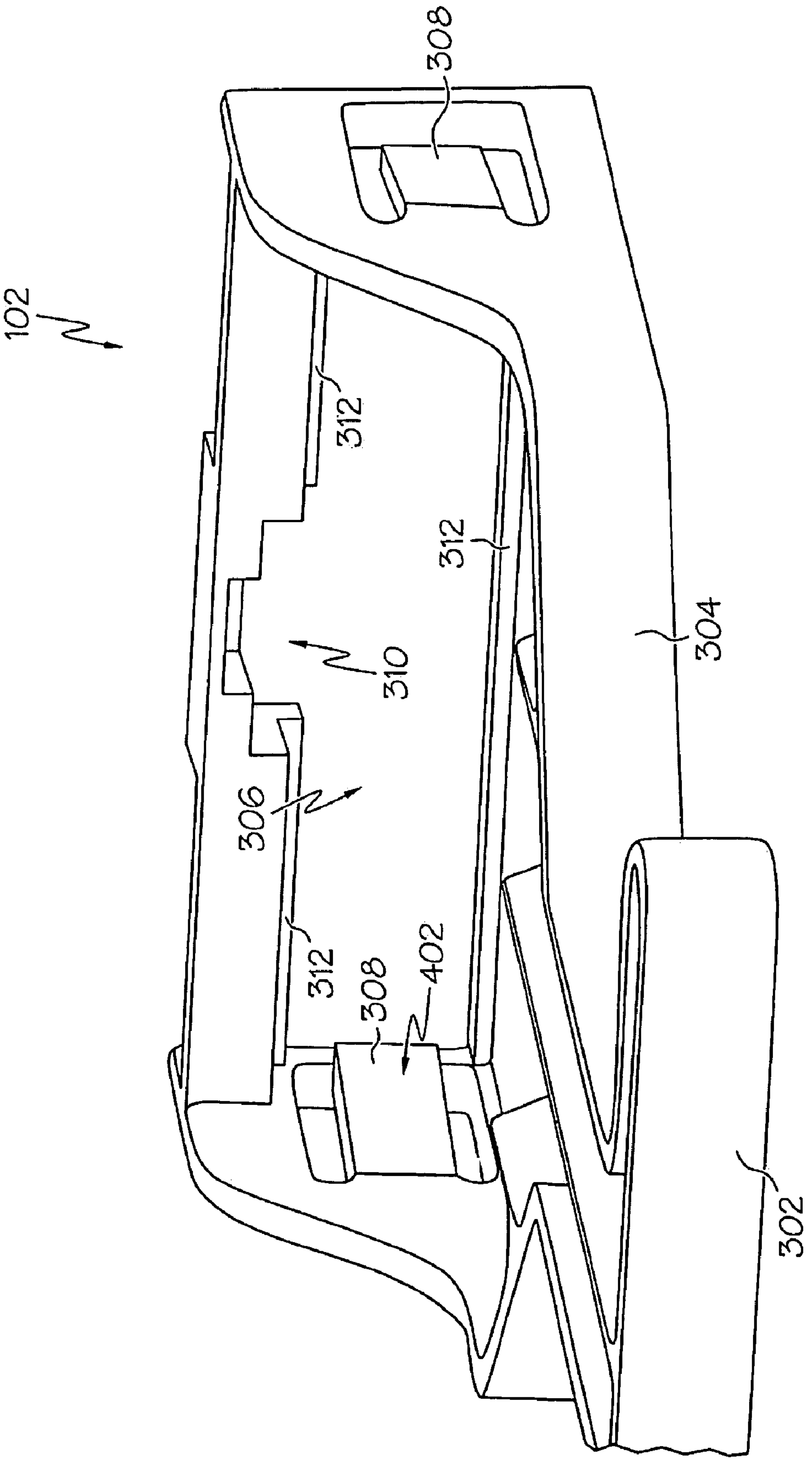
FIG. 4 depicts a top, left side, and front side partial perspective view of the remote connector agent of FIG. 1 according to one embodiment.

FIG. 4 depicts a top, left side, and front side partial perspective view of the remote connector agent 102 of FIG. 1 according to one embodiment. The depicted remote connector agent 102 of FIG. 4 is an alternative view of the remote connector agent 102 of FIG. 3 and the description of FIG. 3 will not be repeated in the interest of brevity. The remote connector agent 102 of FIG. 4 includes two insertion snap pushers 308 each with a snap pusher inner surface 402. When a connector 104 is inserted into the connector cavity 306, the connector 104 may apply a force to the snap pusher inner surfaces 402 to push the insertion snap pushers 308 out of the way of the connector 104. Once the connector 104 is sufficiently inserted, the insertion snap pushers 308 may return inward to substantially their original positions so that the snap pusher lower surface 314 (as depicted in FIG. 3) may rest on top of the lip 212.

Figure 5:
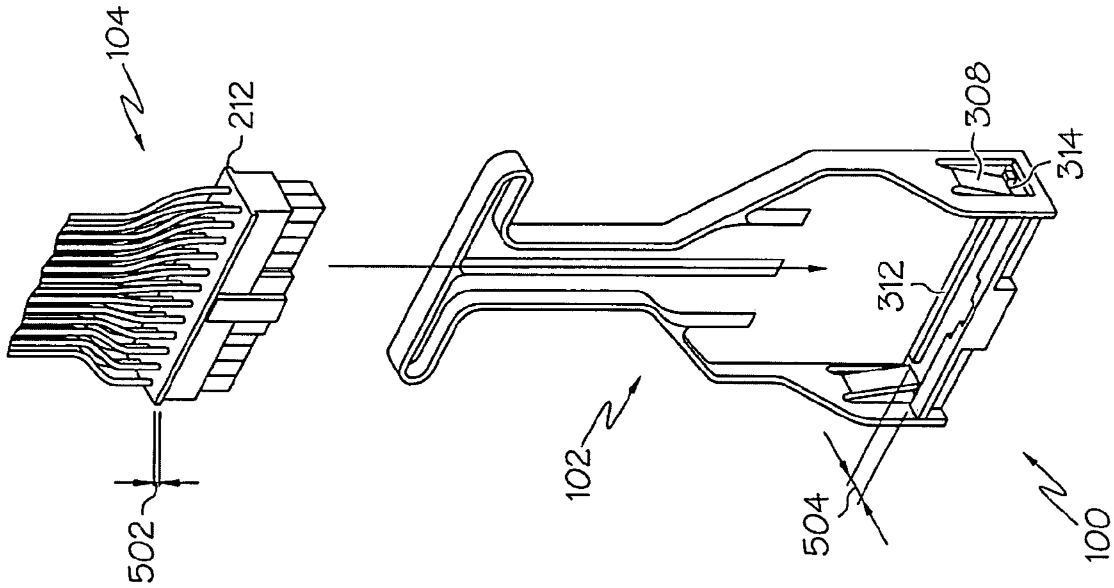
FIG. 5 depicts a front, top, and right side perspective view of a connector being inserted into a remote connector agent according to one embodiment.

FIG. 5 depicts a front, top, and right side perspective view of a connector 104 being inserted into a remote connector agent 102 according to one embodiment. The connector 104 of FIG. 5 has a lip 212 with a lip height 502. The lip height 502 may be the height, or thickness, of the lip 212. As described previously, the connector 104 may be inserted into the remote connector agent 102. During insertion, the connector 104 may push aside the insertion snap pushers 308 and, once the connector 104 is sufficiently inserted, the insertion snap pushers 308 return to their original position so that they may restrain the connector 104 from the top of the lip 212. Once it is inserted, the lip 212 of the connector 104 may be positioned in between the snap pusher lower surface 314 and the retraction holder ledge 312. The top surface of the lip 212 may be facing the snap pusher lower surface 314 and the bottom surface of the lip 212 may be facing the retracting holder ledge 312. The distance between thesnap pusher lower surface 314 and the retraction holder ledge 312 is the float distance 504. According to the disclosed embodiments, the float distance 504 may advantageously be larger than the lip height 502 so that there is a gap, or float, of the lip 212.

During insertion of the connector 104 and once the connector 104 impacts the header, the insertion snap pusher 308 may be in contact with the lip 212. In this situation, the float is between the lip and the retraction holder ledge 312 while the snap pusher lower surface 314 is imparting a downward force to the connector 104. The connector 104 and remote connector agent 102 may maintain this relative relationship while the connector 104 is inserted into the header. When a user begins pulling up on the remote connector agent 102, the initial motion of the remote connector agent 102 (while the connector 104 remains stationary) unlatches the snap 208. As the user continues to pull upwards, the retraction holder ledge 312 will contact the bottom surface of the lip 212, resulting in the float being between the lip 212 and insertion snap pushers 308. It is during this time that the float is moving from above the lip 212 to below it that the connector snap release actuator 310 releases the snap 208, as will be described in more detail subsequently. The retraction holder ledge 312 may then impart the force necessary to retract the connector 104 from the header until the connector 104 is free.

Figure 6:
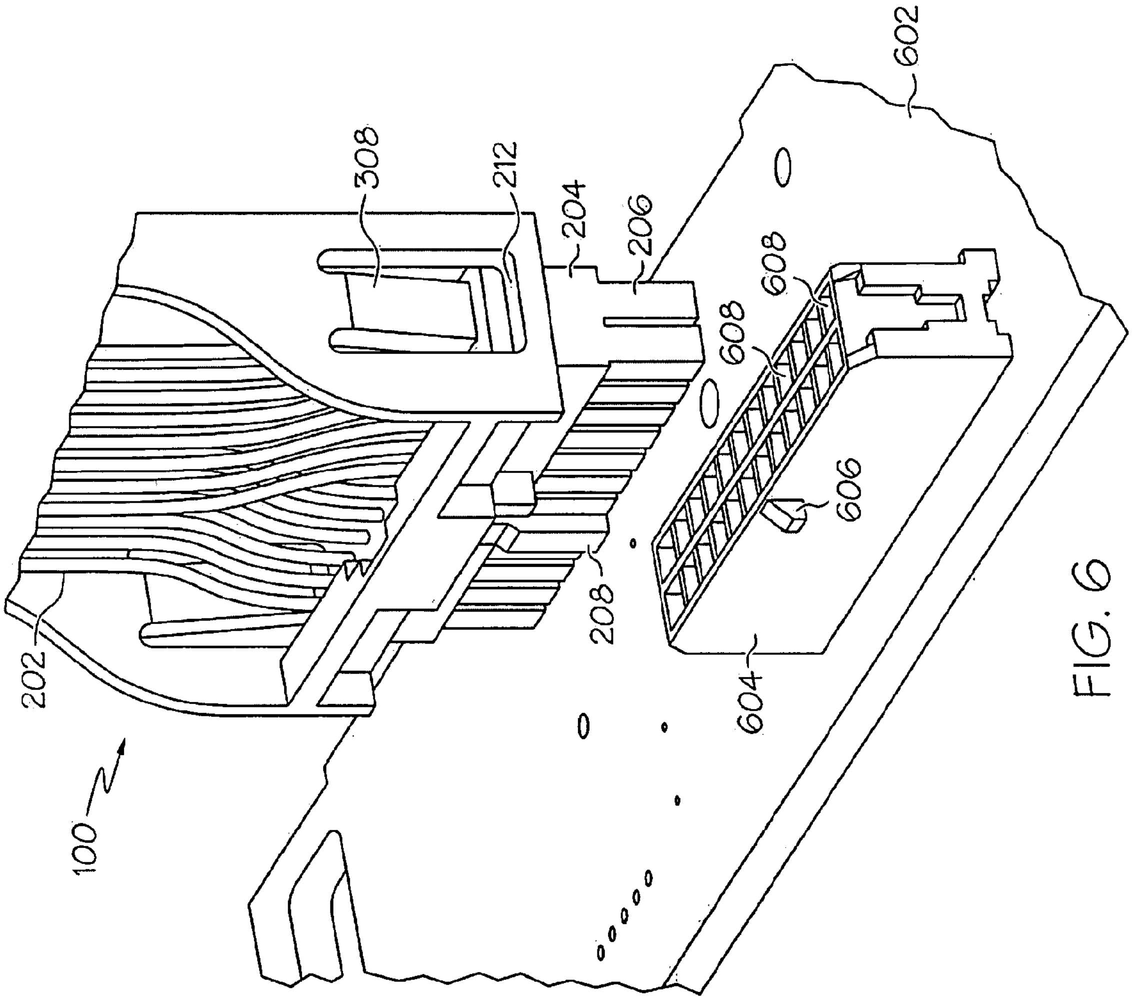
FIG. 6 depicts a front, top, and right side perspective partial view of a connector loaded into a remote connector agent being inserted into a header according to one embodiment.

FIG. 6 depicts a front, top, and right side perspective partial view of a connector 104 loaded into a remote connector agent 102 being inserted into a header according to one embodiment. In FIG. 6, a header 604 with a header latch point 606 is depicted attachcd to a board 602. Board 602 may be any type of surface, including a board such as a circuit board or printed circuit board (PCB). Headers 604 are known in the art, and may include a plurality of electrical pin receptacles 608 to receive the electrical pins 206 of a connector 104 when it is inserted. The header latch point 606 may be a latch or other protuberance that may restrain a snap 208 that is positioned over it.

In FIG. 6, the position of a connector 104 loaded into the remote connector agent 102 to form a loaded remote connector system 100 is illustrated. When the connector 104 is being inserted, the insertion snap pushers 308 may be pushing down on the lip 212 and are positioned to push the connector 104 into the header 604. The snap 208 is free to pivot, or rotate, outward over the header latch point 606 even when the connector 104 is inserted into the remote connector agent 102. The snap 208 and header latch point 606 may accordingly perform their intended functions in spite of the presence of the remote connector agent 102, allowing the remote connector system 100 to be securely latched to the header 604 and board 602.

Figure 7:
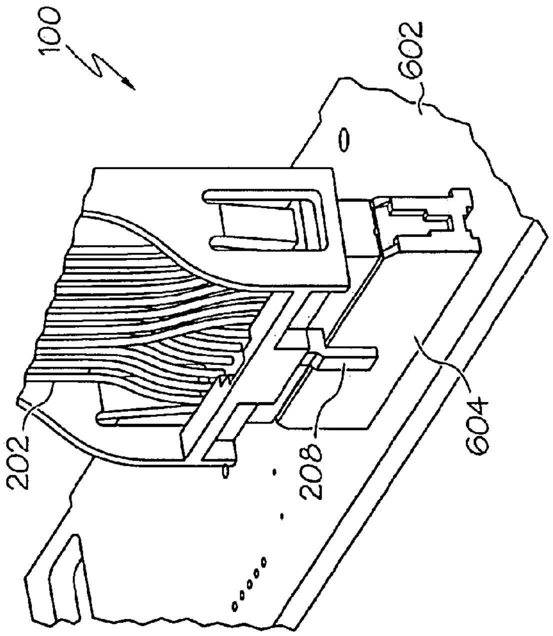
FIG. 7 depicts a front, top, and right side perspective view of a remote connector system latched to a header according to one embodiment.

FIG. 7 depicts a front, top, and right side perspective view of a remote connector system 100 latched to a header according to one embodiment. In FIG. 7, the snap 208 of the connector 104 is in place to attach the connector 104 and remote connector agent 102 to the header 604 and board 602. The connector 104 may accordingly attach to the header 604 as if the remote connector agent 102 was not present.

Figure 8:
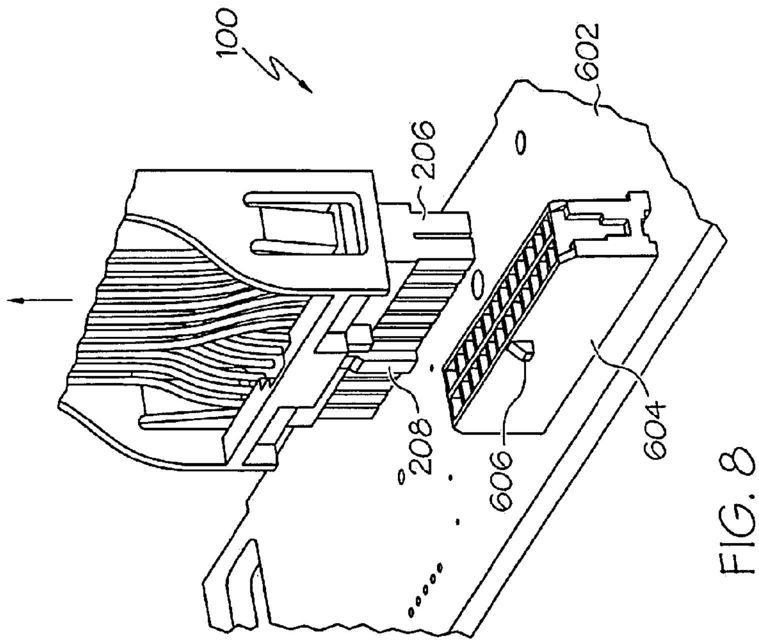
FIG. 8 depicts a front, top, and right side perspective view of a remote connector system removed from a header according to one embodiment.

FIG. 8 depicts a front, top, and right side perspective view of a remote connector system 100 removed from a header 604 according to one embodiment. In the depicted embodiment, the remote connector system 100 is fully retracted from the header 606. As the remote connector system 100 is pulled upwards, the snap 208 releases from the header latch point 606 and then the electrical pins 206 retract from the header 604. The snap 208 release will be described in more detail in relation to FIG. 10. Once a user has fully retracted the connector 104, they may remove the connector 104 from the remote connector agent 102, reinsert the remote connector system 100 into another header 604, or perform other tasks. In some embodiments, to remove the connector 104 from the remote connector agent 102 the user may manually push the insertion snap pushers 308 outward so that the connector 104 may be more easily removed.

Figure 9:
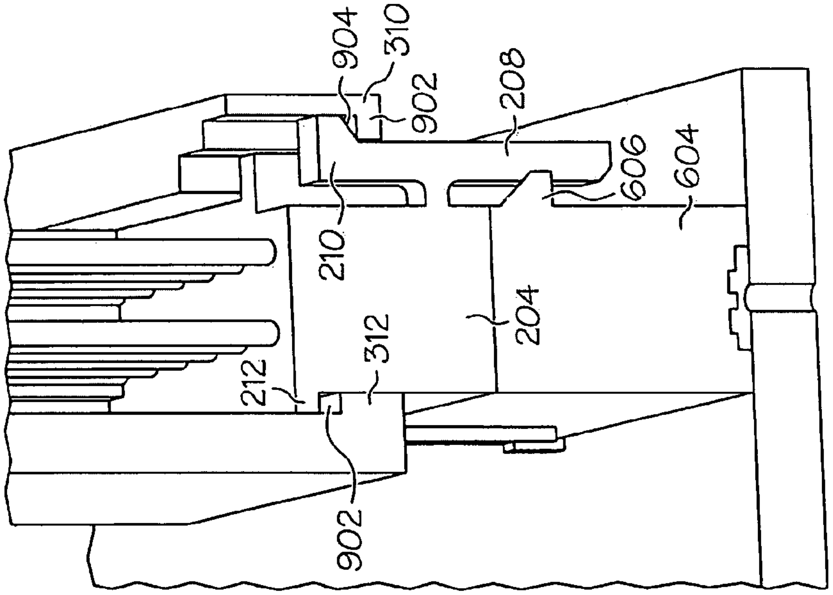
FIG. 9 depicts a top, back, and side partial perspective view of a remote connector system attached to a header according to one embodiment.

FIG. 9 depicts a top, back, and side partial perspective view of a remote connector system 100 attached to a header according to one embodiment. In the embodiment of FIG. 9, snap 208 is positioned over the header latch point 606 to securably retain the connector 104 to the header 604. The connector snap release actuator 310 may be positioned underneath the finger release touch point 210 with a float gap 902 in between them. The float gap 902 may remain from the initial insertion of the connector 104 into the header 604. In one embodiment, the finger release touch point 210 and/or the connector snap release actuator 310 form a ramp 904 between them. The ramp 904 may facilitate pivoting or rotation of the snap 208 during retraction, as described in relation to FIG. 10. A similar float gap 902 may exist between the lip 212 and the retraction holder ledge 312. The connector 104 is thus 'pushed in' with the float gaps 902 below the lip 212 and/or snap 208, resulting from the action of pushing the connector 104 down into the header 604 with the remote connector agent 102.

Figure 10:
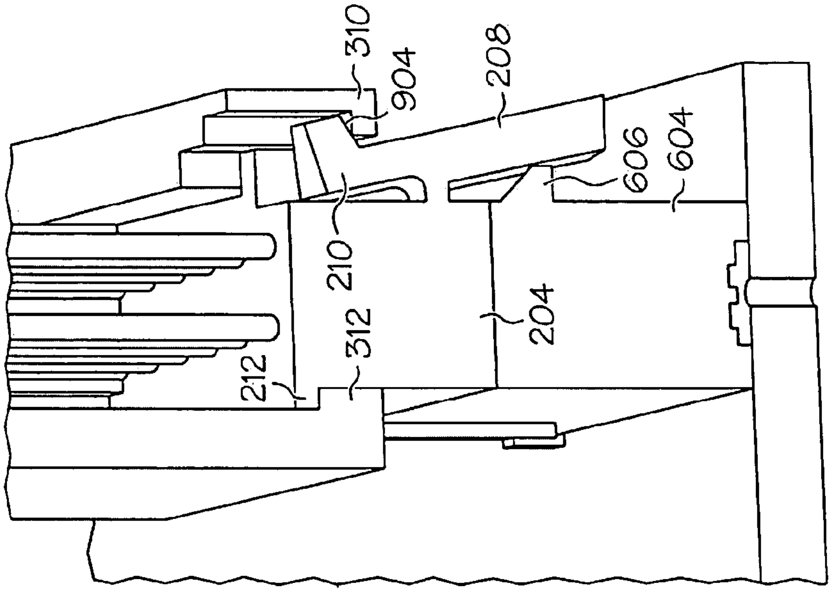
FIG. 10 depicts a top, back, and side partial perspective view of a remote connector system where the snap has been released according to one embodiment.

FIG. 10 depicts a top, back, and side partial perspective view of a remote connector system 100 where the snap has been released according to one embodiment. In the embodiment of FIG. 10, the process of pulling up the remote connector agent 102 has begun (from the latched state of FIG. 9) and the snap 208 has been released. Once the snap 208 has been released, a user may pull the connector 104 out of the header 604. As the remote connector agent 102 is pulled upwards, the float gaps 902 of FIG. 9 are closed. During this time, the ramp 904 formed by the connector snap release actuator 310 and the finger release touch point 210 may gradually pivot or rotate the snap 208 until it is clears the header latch point 606 and is accordingly released. Once the float gaps 902 are substantially eliminated, the retraction holder ledge 312 may be in contact with the lip 212 and the connector snap release actuator 310 may be in contact with the finger release touch point 210. By ramping the connector snap release actuator 310, the snap 208 may be pivoted clear of the header latch point 606 smoothly by pulling of the remote connector agent 102 before extraction of the connector 104. From the user's perspective, a single pulling motion of the remote connector agent 102 first releases the snap 208 and then extracts the connector 104. The force exerted between the retraction holder ledge 312 and the lip 212 and between the connector snap release actuator 310 and the finger release touch point 210 may pull the connector 104 upwards.

Figure 11:
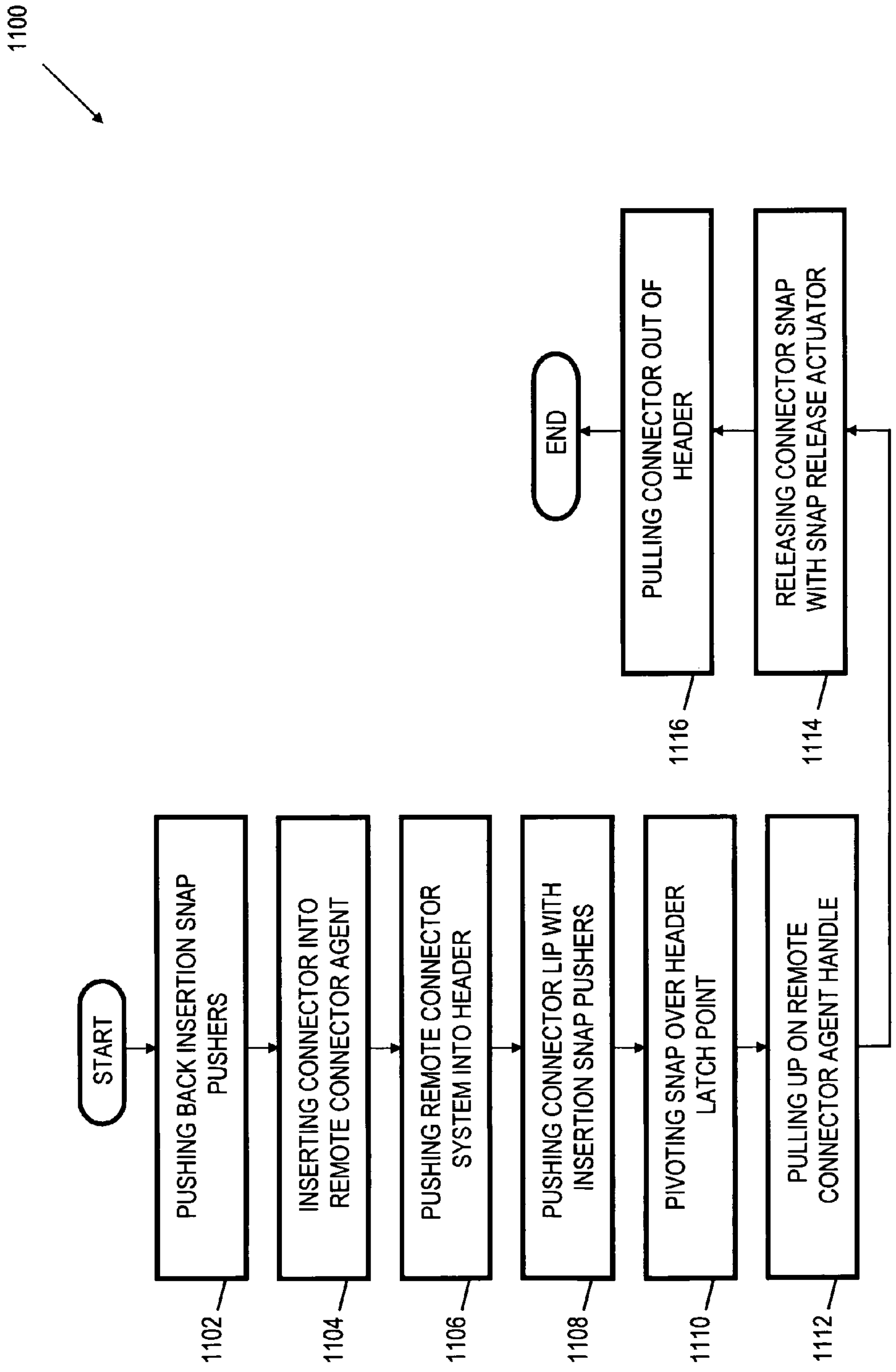
FIG. 11 depicts an example of a flow chart inserting and removing a connector with a remote connector agent according to one embodiment.

FIG. 11 depicts an example of a flow chart inserting and removing a connector 104 with a remote connector agent 102 according to one embodiment. Flow chart 500 begins with element 502, where a user begins the process of inserting a connector 104 into a remote connector agent 102 by pushing back the insertion snap pushers 308 after which the user may place the connector 104 fully into the connector cavity 306 at element 1104. Once the connector 104 is positioned within the remote connector agent 102, the insertion snap pushers 308 may return to their original positions to help hold in the connector 104. In some embodiments, the action of the user placing the connector 104 in the connector cavity 306 may provide sufficient force to push back the insertion snap pushers 308. In other embodiments, the user may manually push back the insertion snap pushers 308 or use another methodology.

Once the connector 104 and remote connector agent 102 have been combined into a remote connector system 100, the user may push the remote connector system 100 into the header 604 at element 1106. As described previously, the insertion snap pushers 308 may impart the downward force to a lip 212 of the connector 104 as it is inserted. As part of the insertion process, snap 208 may pivot over the header latch point 606 at element 1110.

To pull out the remote connector system 100, a user may pull up on the handle 302 of the remote connector agent 102 at element 1112. As described in relation to FIG. 10, at element 1114 the upward force from pulling the handle 302 eliminates the float and releases the snap 208 by action of the connector snap release actuator 310. Continued upward force may pull the connector 104 out the header 604 entirely at element 1116, after which the method terminates.

It will be apparent to those skilled in the art having the benefit of this disclosure that the present invention contemplates a system, method, and apparatus for inserting and removing a connector with a remote connector agent. It is understood that the form of the invention shown and described in the detailed description and the drawings are to be taken merely as examples. It is intended that the following claims be interpreted broadly to embrace all the variations of the example embodiments disclosed.

While certain operations have been described herein relative to a direction such as "above" or "below" it will be understood that the descriptors are relative and that they may be reversed or otherwise changed if the relevant structure(s) were inverted or moved. Therefore, these terms are not intended to be limiting.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A remote connector system, comprising:

a connector for connection to a header, comprising:

a body having a top surface, a bottom surface, two longer surfaces, and two shorter surfaces;

a plurality of wires attached to the body at the top surface;

a plurality of electrical pins attached to the body at the bottom surface, each pin providing an electrical connection between a wire and the header when the connector is installed in the header;

a lip of the body extending substantially around an edge of the top surface, the lip having a top surface, a bottom surface, and a thickness between the top surface and bottom surface equal to a lip height; and a single pivotable snap attached to the body at a midpoint of one of the longer surfaces of the body, the snap attaching the connector to a header when the connector is inserted into the header, the snap having a finger release touch point that releases the snap when actuated; and a remote connector agent apparatus, comprising:

a main body having a back wall and two sidewalls, the main body forming a connector cavity for holding the connector;

a front portion of the main body connecting the two sidewalls and positioned at a first end of the main body;

two insertion snap pushers each having a snap pusher lower surface and each positioned within one of the two sidewalls of the main body, the insertion snap pushers moving outward during insertion of a connector into the connector cavity and moving inward after insertion of the connector, wherein the snap pusher lower surfaces rest on the lip of the connector after insertion of the connector;

a first retraction holder ledge positioned on the back wall and at the first end of the main body to support the lip of the inserted connector during retraction;

a second retraction holder ledge positioned on the front portion of the main body to support the lip of the inserted connector during retraction;

wherein the two insertion snap pushers and the two retraction holder ledges have a float distance between them that is larger than the height of the connector lip, and wherein further the connector lip is positioned between the two insertion snap pushers and the two retraction holder ledges while the connector is held by the remote connector agent apparatus; and a single connector snap release actuator positioned midway between the two sidewalls of the main body and within the front portion of the main body, the connector snap release actuator having a ramp for contacting the finger release touch point of the connector, and the connector snap release actuator pivoting the snap of the inserted connector to release the snap in response to a pulling force on the remote connector agent by first imparting a force to the single finger release touch point of the snap via the ramp to release the snap before pivoting the snap.

2. The system of claim 1, further comprising a handle of the remote connector agent apparatus.

3. The system of claim 1, wherein the remote connector agent apparatus is comprised of one or more of metal, plastic, die-cast aluminum, or ceramic.

* * * * *